(12) United States Patent
Tiainen

(10) Patent No.: US 11,418,043 B2
(45) Date of Patent: Aug. 16, 2022

(54) AC CHARGING CONTROL

(71) Applicant: BrightCharger Europe Oy Ltd, Kinkomaa (FI)

(72) Inventor: Harri Tiainen, Kinkomaa (FI)

(73) Assignee: BrightCharger Europe Oy Ltd., Kinkomaa (FI)

(*) Notice: Subject to any disclaimer, the term of this patent is extended or adjusted under 35 U.S.C. 154(b) by 130 days.

(21) Appl. No.: 17/087,779

(22) Filed: Nov. 3, 2020

(65) Prior Publication Data

US 2021/0135464 A1    May 6, 2021

(30) Foreign Application Priority Data

Nov. 5, 2019 (FI) ...................................... 20195948

(51) Int. Cl.
*H02J 7/00* (2006.01)
*H02J 7/04* (2006.01)

(52) U.S. Cl.
CPC .......... *H02J 7/0031* (2013.01); *H02J 7/0049* (2020.01); *H02J 7/04* (2013.01); *H02J 7/00714* (2020.01)

(58) Field of Classification Search
CPC .. H02J 7/00714; H02J 7/02; H02J 7/04; H02J 5/00; H02J 7/0031; H02J 7/00;
(Continued)

(56) References Cited

U.S. PATENT DOCUMENTS 8,508,079 B1    8/2013 Corrado
2010/0171465 A1    7/2010 Seal et al.
(Continued)

FOREIGN PATENT DOCUMENTS

| WO | WO 2017/162905 A1 | 9/2017 | |
| WO | WO 2018/073483 A1 | 4/2018 | |
| WO | WO-2020054098 A1 * | 3/2020 | ......... G01R 31/3648 |

OTHER PUBLICATIONS

Extended European Search Report for European Patent Application No. 20205582.8 dated Mar. 19, 2021, 8 pages.
(Continued)

*Primary Examiner* — Richard Isla
*Assistant Examiner* — Mohammed J Sharief
(74) *Attorney, Agent, or Firm* — Merchant & Gould P.C.

(57) ABSTRACT

The device (10) is connected to AC supply (12). The device (10) is also connected to a charger that may charge a battery. The device (10) detects an AC current and AC voltage when the charging operation is ongoing and/or interrupted. Based on the detected AC voltage and AC current, the device (10) determines an active power. The device (10) may also obtain electrical characteristics of the charger. Based on the active power, the device (10) may determine a DC charging current taking place at the charger charging the battery. The characteristics of the charger may be utilized when determining this. Consequently, the device (10) can determine a currently used DC charging current of the charger. The device (10) uses an algorithm to determine an appropriate point of time for disconnecting the AC output for disconnecting the charging operation. The device (10) inspects the charging current in a stepwise procedure. The device (10) detects a maximum value of the charging current and compares this to a value determined after a predetermined time. When the difference between these meets a threshold, the device (10) proceeds to check another threshold by checking a difference between a current value at that point of time and another a value determined after a certain time. When another threshold is met, the device (10) disconnects the AC output (12) and the charging operation stops.

17 Claims, 5 Drawing Sheets

(58) Field of Classification Search
CPC ........ H02J 7/0047; H02J 7/0049; H02J 7/007; H02J 7/00712; H02J 7/045; H02H 7/04
USPC ..................................................... 320/162
See application file for complete search history.

(56) References Cited

U.S. PATENT DOCUMENTS

| 2015/0022154 A1* | 1/2015 | Kim .................. H02J 7/342 320/114 |
| 2019/0227615 A1 | 7/2019 | Hsu |
| 2019/0288537 A1 | 9/2019 | Blaser |

OTHER PUBLICATIONS

Finnish Search Report for corresponding Finnish Patent Application No. 20195948 dated Jun. 11, 2020, 1 page.

* cited by examiner

AC CHARGING CONTROL

This application claims benefit of Serial No. 20195948, filed 5 Nov. 2019, in Finland and which application is incorporated herein by reference. To the extent appropriate, a claim of priority is made to the above disclosed application.

TECHNICAL FIELD

The disclosure relates to a device, a method and a computer program for controlling an alternating current, AC, based switch for charging a battery.

BACKGROUND

Many portable electrical devices have a battery that requires charging, and the charging operation has become a daily routine to people. People often keep their electrical devices such as smart phones, laptops, tablets, electric toothbrushes, shavers or for example drills charging overnight or almost all the time. They also may simply forget to unplug their chargers. In addition to consumer electronics, electric vehicles are becoming more common and their large battery banks require frequent and time-consuming charging. Excessive charging of battery powered devices wastes energy, reduces battery lifetime and increases the risk of fire.

From the user's perspective, it requires effort to repeatedly monitor the filling or the charge percentage of the battery of the chargeable device, due to which the device may be charged for a considerably longer time than required to charge the battery nearly full. However, device batteries can only be charged for a limited amount of time before they may become damaged or worn. Keeping chargers plugged in when they are not needed consumes unnecessary energy, wears down batteries and causes overheating of both batteries and the chargers themselves, which increases the risk of fire.

The charging process can be monitored; however, typically this involves complexity in the battery or in the charger. Furthermore, a specific charger with the monitoring capability often connects to a designed battery only, and interoperability of various manufacturers or different standards is not possible.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide an AC charging control device. The object is achieved by the features of the independent claims. Some embodiments are described in the dependent claims.

In an aspect, a device comprises: a detector configured to detect an alternating current, AC, charging current for a charger charging a battery of an electrical device; a switch configured to connect and disconnect an AC output configured to be connected to the charger; a controller configured to: detect an AC voltage; based on the AC voltage and the AC charging current, determine an active power; based on the active power, determine a DC charging current of the charger and determine DC charging current values in relation to the DC charging current; detect a maximum value of the DC charging current values based on a peak value of the active power; after detecting the maximum current value, detect a threshold DC current value of the DC charging current values in relation to the detected maximum current value; after detecting the threshold DC current value, detect a change of subsequent values of the DC charging current values, and based on the change, detect whether the change is below a threshold; after detecting that the change is below of the threshold, control the switch for disconnecting the AC output. The device being configured in such a way may, for example, monitor a DC charging process directly from the AC based device that is connected to the charger performing the DC charging process. The charging process may be directly monitored based on the AC voltage and AC current without a need for directly monitoring the DC current at the charger. The device may control a typical charger device that is charging a battery so that the battery may be charged without pumping current to the battery where the charging operation is switched on and off needlessly when the battery is nearly full or full. The charger may be switched off at an appropriate point of time, so the charging operation is safe.

In an embodiment of the aspect, alternatively or additionally, the controller is further configured to receive characteristics of the charger comprising information of a DC power of the charger and information of a loss of the charger and determine the DC charging current accordingly. With such configuration, the device may determine the DC charging current.

In an embodiment of the aspect, alternatively or additionally, the controller is further configured to receive information of a DC voltage of the charger and determine the DC power accordingly, wherein the DC voltage further comprises said characteristics. With such configuration, the device may determine the DC charging current.

In an embodiment of the aspect, alternatively or additionally, the controller is further configured to determine an angular difference between the AC voltage and the AC current, based on the angular difference determine a power factor, and based on the power factor determine the active power. With such configuration, the device may determine the DC charging current.

In an embodiment of the aspect, alternatively or additionally, the controller is further configured to switch the device off after detecting the change below of the threshold, wherein switching off the device causes the AC output to disconnect. With such configuration, the device may save energy and reduce risks for potential fire hazard.

In an embodiment of the aspect, alternatively or additionally, after controlling the switch for disconnecting the AC output, the controller is further configured to shut down the device after a predetermined time has lapsed. With such configuration, an appropriate charging may be ascertained with controlled switch off.

In an embodiment of the aspect, alternatively or additionally, a manual switch is further included and configured to switch the device on when the device has been switched off, wherein switching the device on triggers the detector and the controller to start operating. The user may trigger the charging operation for example by coupling a charger to the device, or otherwise.

In an embodiment of the aspect, alternatively or additionally, the controller is configured to detect the maximum value so that a new value is saved each time a maximum value which is higher than the previous value is detected; and the controller is configured to proceed to detecting the threshold DC current value if: an average value of the detected DC charging current values within a predetermined time interval is smaller than the maximum value; and a predetermined time has passed from detecting the latest maximum value. With such configuration, an appropriate start and first stage of the charging process may be detected.

In an embodiment of the aspect, alternatively or additionally, if the controller detects that the maximum value is below a general threshold value within a period of time, the controller is configured to directly control the switch for disconnecting the charging. With such configuration, the device may detect that the charging operation has not started and shut it down.

In an embodiment of the aspect, alternatively or additionally, the threshold DC current value is a predetermined percentage value of the maximum value. This may provide reasonable information about the charging process so that the charging operation may proceed to the next stage.

In an embodiment of the aspect, alternatively or additionally, the controller is configured to detect the change so that at least two subsequent DC charging current values are detected, and the two subsequent DC charging current values are compared to each other; and wherein the change is below the threshold if the latest value of the subsequent values is by a certain amount smaller than the previous value of the subsequent values; and the controller has performed detection for a predetermined checking time. With such configuration, the device may finalize the charging operation so that the battery is charged appropriately.

In an embodiment of the aspect, alternatively or additionally, the controller is configured to detect the change so that three subsequent DC charging current values are detected, the centremost value of the three values is deleted and the outermost values of the three values are compared to each other; and wherein the change is below the threshold if a difference between the outermost values is smaller than a certain amount; and the controller has performed detection for a predetermined checking time. With such configuration, more accurate detection of the third stage may be obtained.

In an embodiment of the aspect, alternatively or additionally, after controlling the switch for disconnecting the AC voltage, the controller is further configured to switch illumination of the device on. With such configuration, the device may indicate that charging has been terminated.

In an embodiment of the aspect, alternatively or additionally, a charger comprises the device according to any preceding embodiment, and is configured to charge the battery of the electrical device. A charger may have the device integrated into it.

In an embodiment of the aspect, alternatively or additionally, a structure comprising the device according to any preceding embodiment is configured to connect to the charger. A structure may have the device integrated into it, and the charger may be connected to the structure. The structure may be, for example, an electric vehicle charging station.

According to another aspect a method comprises: detecting an alternating current, AC, charging current for a charger charging a battery of an electrical device; detecting an AC voltage; based on the AC voltage and the AC charging current, determining an active power; based on the active power, determining a DC charging current of the charger and determining DC charging current values in relation to the DC charging current; detecting a maximum value of the DC charging current values based on a peak value of the active power; after detecting the maximum value, detecting a threshold DC current value of the DC charging current values in relation to the detected maximum current value; after detecting the threshold DC current value, detecting a change of subsequent values of the DC charging current values, and based on the change, detecting whether the change exceeds a threshold; after detecting the exceeding of the threshold, controlling a switch for disconnecting an AC output configured to be connected to the charger.

According to yet another aspect a computer program comprises a program code configured to perform the operations of the method when executed by a device according to the first aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
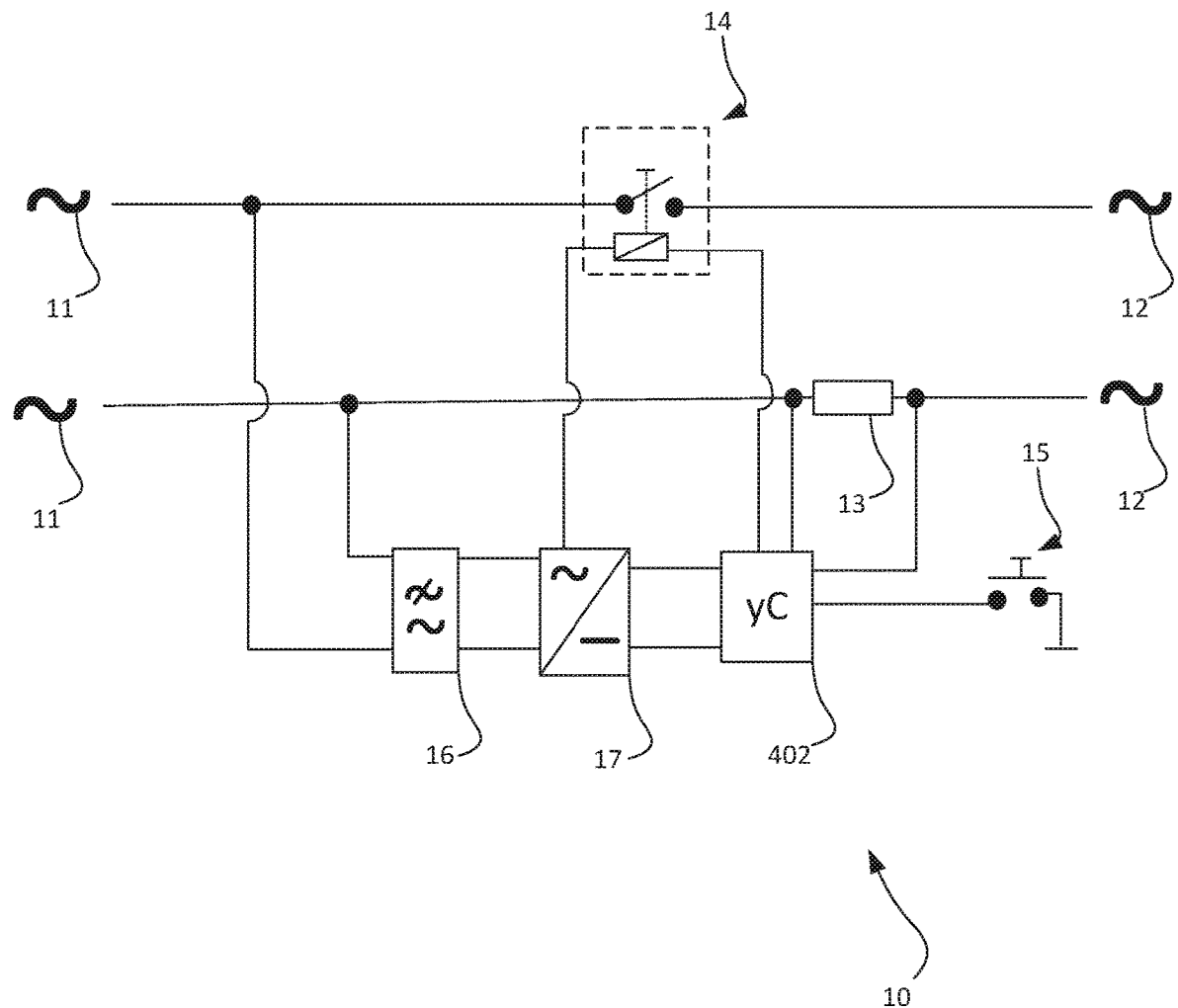
FIG. 1 illustrates a schematic block diagram of a circuit of a device according to an embodiment.

The detailed description provided below in connection with the appended drawings is intended as a description of the present embodiments and is not intended to represent the only forms in which the present embodiment may be constructed or utilized. However, the same or equivalent functions and sequences may be accomplished by different embodiments.

According to an embodiment, the device is connected to AC, for example to the mains having approximately 100-250 volts, V, typically 110V or 230V. In an embodiment, the device is connected to a three-phase AC electricity network. The voltage of the three-phase AC electricity network may depend on national standards and it may be for example 400 V or 380 V. The device may be connected to the mains having approximately 380-400 volts. The device is also connected to a charger that may charge a battery. The device detects an AC current and AC voltage when the charging operation is ongoing and/or interrupted. Based on the detected AC voltage and AC current, the device determines an active power. The device may also obtain electrical characteristics of the charger. Based on the active power and electrical characteristics, the device may determine a DC charging current taking place at the charger charging the battery. The characteristics of the charger may be utilized when determining this. Consequently, the device can determine a currently used DC charging current of the charger. The device uses an algorithm to determine an appropriate point of time for disconnecting the AC output for disconnecting the charging operation. The device inspects the charging current in a stepwise procedure. The device detects a maximum value of the charging current and compares this to a value determined after a predetermined time. When the difference between these meets a threshold, the device proceeds to check another threshold by checking a difference between a current value, at that point of time, and another value determined after a certain time. When another threshold is met, the device disconnects the AC output and the charging operation stops.

According to the embodiment, the DC charging process can be monitored from the AC based device that is connected to the charger performing the DC charging process. The device may be between the AC plug and the charger, for example. The charging process may be directly reviewed based on the AC voltage and AC current without a need for directly monitoring the DC current at the charger.

The device may be coupled or integrated to any basic charging device. As an example, the device may be integrated in an electric vehicle charging station. The charging station delivers AC current to a built-in, onboard charger of the electric vehicle. The charging station is connected to an electrical network to supply either single phase or three phase AC current for the charger of the electric vehicle. For example, the charging station may be connected to a power supply of 230 or 400 volts AC. Alternatively, the charging station may transform the AC current to DC itself before delivery. In both cases, the device is able to monitor the charging process based on the AC side measurements and control the charging operation. In an embodiment, the device may be connected to a plug of the charging station or the electric vehicle configured for charging.

As discussed above, FIG. 1 illustrates a schematic block diagram of a device 10. The device 10 controls a charging process of a battery of a charger directly based on AC current.

The device 10 can be connected to AC mains by an input 11. The AC mains may be 100-240V AC, 50-60 Hz. Alternatively, the AC mains may provide higher three-phase AC voltage, for example 380-400 V, 50-60 Hz. The device can also be connected to a charger (not shown in the figures) by an output 12. The output voltage may be 100-240V AC or 380-400 V, depending on the input voltage. The device 10 comprises a filtering module 16 and a voltage conversion module 17. Voltage conversion 17 converts the AC mains, for example 230V, to a low voltage DC such as 3, 3V. As another example, the voltage conversion unit 17 may convert the AC mains of 400 V to the low voltage DC. The low voltage DC is fed to a microprocessor 402. The microprocessor 402 may be an embodied controller. The microprocessor 402 is connected to a current detector 13 and to a start button 15. The current detector 13 may be a resistor that is connected to return the AC current returning from the charger. The current detector 13 is also connected to the AC input 11 and AC output 12. The start button 15 is also connected to earth. An AC output switch 14 is connected to the AC input 11, AC output 12, voltage conversion module 17 and to the microprocessor 402. The AC output switch 14 can connect and disconnect the connection between the AC input 11 and AC output 12. In FIG. 1 the dark round symbol is a connection between crossing lines, and the semicircle is a crossing without a connection between crossing lines.

Charging starts with an external excitation, for example by triggering the push button 15. The AC output switch 14 may be connected accordingly to start the charging operation. The charging operation ends according to algorithm calculation by the microprocessor 402 when a battery (not shown) is charged to a desired charge. The power is cut off by the AC output switch 14 when charging is complete, and may be turned on by the switch 14 when charging is desired. According to an embodiment, AC electronics may be constantly on, and only the voltage of the AC output 12 is turned on and off. For example, the microprocessor 402 may be constantly powered, even though the switch 14 is disconnected.

The device 10 can accordingly directly control a charger that is connected to the AC output 12. The device controls the charger based on AC current, by the detector 13 and microprocessor 402, and also by disconnecting the charging operation of the external charger by the AC output switch 14.

As an example, the device 10 may control a charger of an electric bicycle or electric scooter battery. The batteries of electric bicycles and scooters need frequent charging. The batteries are usually left to charge when not in use, sometimes even for days. The charger may be a charging dock. The device 10 may be coupled between an AC plug and the charger. With the device 10, a user may start charging, for example, by pushing the button in the device 10. The device 10 takes care that the battery is substantially fully charged by monitoring AC values, and then automatically ends the charging operation. The device 10 may enable that the average range provided by the battery remains high for a longer time as excessive charging and wearing of the battery may be reduced.

As another example, the device 10 may control a charging dock of an electric toothbrush. The charging may be initiated by a user by pushing the button in the device 10 to close the AC output switch 14. In response, current may start to flow to the charger. The DC charging process may be monitored from the AC based device 10 that is connected to the charging dock. When the toothbrush is charged to a desired level, the device 10 may disconnect the charging operation of the charging dock. If another family member wishes to charge his toothbrush after the first toothbrush has been charged, he may replace the toothbrush and start the charging operation again by pushing the button. However, if the button is pushed when the fully charged toothbrush is still in the dock, the device 10 may recognize that the toothbrush is already substantially fully charged based on the AC side current values. Therefore, the device 10 may disconnect current to the charging dock, and the charging is not started again unnecessarily. The device 10 may prolong lifetime of household devices with build-in batteries by controlling the everyday charging operations. Further, the device 10 is easy to use for successive charging events and it provides reliable operation.

FIG. 1 shows the connection of the algorithm at the microprocessor 402 to the AC electronics (such as a power outlet or the mains) and its required components. For example, the device 10 may be an extension cord to be connected to a wall, one end of which is continuously connected to AC power through an electrical outlet and the other end can be switched on and off by means of the control algorithm. When the charger is connected to the device 10 and a user wants to start charging, the user may press the start button 15 to start charging. In an embodiment, the button may be placed in the female connector of the extension cord. Pressing the button 15 wakes up the detection electronics in the microcontroller 402 from sleep mode. The microprocessor 402 turns on the AC output 12 via the AC output switch 14, whereupon the charger under load begins to charge the attached battery. The AC charge current is measured by the detector 13 such as a resistor connected to the return AC current circuit. The microcontroller 402 measures the AC voltage and the current of the loaded battery and uses these power components to calculate the correct charge cut-off time using the algorithm. When charging is complete and the AC output voltage 12 is switched off, the system enters a sleep mode. The sleep mode may continue until the next press, and the unit is again charged.

Charging starts with an external excitation (the push button 15) and charging is completed according to algorithm calculation when the battery is charged to the desired charge. The power is cut off throughout the charger when charging is complete, and turns on when a charging operation is desired. The similar operation is possible in the AC device 10, but only for measuring electronics 402, 13. The measuring electronics may be constantly on, and only the AC output voltage 12 is turned on and off.

The device 10 uses a detector 13 such as a power measurement circuit to measure the AC supply voltage and AC load current. By measuring the angular difference between the AC voltage and the AC current, the slope is known by the microcontroller 402 via the detector 13. These are used to determine the apparent, reactive and active power. The microcontroller 402 may further determine power factor based on the measured angular difference. From this information the microcontroller 402 can calculate an effective power.

The active power can be used to determine the DC-side charge current. The active power corresponds approximately to the power used in the DC side. In this case, the active power, or the DC side power, may be derived from the equation:

the power used=the DC side power−charger losses.

The charger losses may be derived from an efficiency of the charger. By receiving and/or knowing the DC voltage of the charger, for example 5V, the DC current can always be calculated from the AC side (at the device 10) by the microcontroller 402. Optionally, the DC voltage may be estimated by the microcontroller 402. For example, the microcontroller 402 may select a typical DC voltage value of chargers or use an RMS (root-mean-square) value of the measured AC voltage. The DC current may be derived and simulated using the DC voltage and the active power. Alternatively, the DC current may be simulated simply based on the active power as the diagram of the active power follows the shape of DC charging current diagram. In other words, when the active power reaches its maximum value, also the DC charging current reaches its maximum value, and when the active power increases/decreases, also the DC charging current increases/decreases correspondingly. The device 10 may not need to know exact values of the DC side, but the device 10 may operate based on simulated values that are accurate enough to be used in estimating relation of peak and threshold values. The microcontroller 402 may use the determined active power to estimate when the peak DC charging current is reached. When a peak active power value is reached, the microcontroller may estimate that also the peak DC charging current value has been reached. After the peak DC charging current value has been determined, subsequent DC charging current values may be compared in relation to the peak DC charging current value in order to determine when the threshold values are met. For example, when the active power has fallen to half from its peak value, also the DC charging current value has fallen to approximately half of its maximum value. The threshold value may indicate a phase or progress of the charging operation, for example, that the battery is substantially full.

A charging operation cut-off time can be calculated by the algorithm. The algorithm examines the various steps of the charging operation from which it is possible to calculate the right moment to stop the charging.

According to an embodiment, the algorithm may operate as follows:
1. The device 10 is configured to recognize the peak of the DC charging current of the charger connected to the device 10, for example within one minute period, and record the peak value.
2. The device 10 is configured to detect when the DC charging current starts to fall and reaches a current threshold value, which may be a certain percentage value of the peak value. When the device 10 detects this, the device 10 is configured to allow operation 3 to activate.
3. The device 10 is configured to detect when the DC charging current falls so that a currently detected value has decreased only slightly compared to the value detected a predetermined checking time ago, for example 2-5 minutes ago. The detected decrease may be for example five to three percentages from the earlier value. When the device 10 detects that this condition is met, the device 10 shuts down the charging operation by the switch 14. This operation can be practically on for a long time; for example, if the device 10 is used, condition 3 does not allow the charging to stop until the device 10 is "at rest". The battery may be appropriately charged.

Generally, if the device 10 recognizes that power consumption is less than 0.2 W, the microprocessor 402 determines that there is nothing connected to it, for example no charger, and shuts down the device 10.

Embodiments are described and illustrated herein as being implemented in connection with a battery powered device such as a smartphone or a mobile phone and a respective charger. These are only examples of an electrical device having a battery to be charged by a charger, and not limitations. As those skilled in the art will appreciate, the present embodiments are suitable for application in a variety of different types of battery operated devices that require charging, for example in tablets, phablets, computers, cameras, game consoles, laptop computers, domestic electrical devices, tools, drills, electrical toothbrushes, vacuum cleaners with a battery, electric cars or vehicles requiring a substantially large power, etc.

The microcontroller 402 configured to perform the charging operations as described in the embodiments may be one or more circuits, such as an asic or logic implemented chip, software, such as a computer program. It may be embodied in the device 10. It could be embedded into the device 10 connected to AC mains, or designed as a design product. The device 10 may be integrated or embedded into a structural element or into a construction, for example inside a wall, having an output to the charger, etc.

According to an embodiment, the device 10 determines a DC charging current of a battery of an electrical device. At first, the device 10 determines a maximum or a peak value of the DC charging current based on measured AC current and AC voltage of the device 10. The maximum value illustrates the maximum DC charging current the charger may output to the battery during the charging operation. The device 10 may determine unrealistic peak values that would not be the indented maximum values such as peak current values at the start of the charging process. The maximum value may act as a reference value for the charging process. It increases reliability of the determination process. The maximum value is required as a reference point to the second stage of the process, for example acting as a starting reference point to the reference value of the second stage. A certain fixed value acting as the maximum value would not work reliably. Additionally, the maximum value may be applied to other charging processes. After detecting the maximum value, the device 10 may determine that the DC charging current is below a certain threshold, for example half of the maximum, so that the final detection is not unintentionally started too early. The second stage, the detection of the threshold, is performed so that the third stage, the turning the charging off, is not being performed too early. Furthermore, it ensures that the battery becomes charged fully enough and the charging operation does not end at a too early stage. Next, the device 10 determines when the decrease of the DC charging current has slowed down so that the change of the charging current curve is gentle, for example a 5% difference between sequential charging current values. The third stage detects that the battery has been charged enough, for example it is substantially full. The first and the second stages ensure that charging does not stop unnecessary early, for example so that the battery is not charged to a substantially full capacity. Otherwise, when the first and the second stages have been considered, the gentle charging curve may be a positive indication that the battery is substantially full or has a reasonable amount of charge, and ending the charging operation is feasible. After that the device 10 switches the charging off by switching off the AC output 12 and ends the charging operation. According to an embodiment, after switching off the charging operation, the device 10 may shut down itself. The device 10 may consequently shut down the whole charger connected to the device 10.

The battery will have been charged to a substantially full charge within the charging operation and period. The charging has terminated after the charging operation and period have ended. Energy consumed by the charger for charging and/or standby may be saved. The lifetime of the battery may be prolonged because charging is ended and there is no pumping of short additional charging cycles. Thus, the battery may be charged to a substantially full state, and charging switched off to save energy and the battery itself. The charging may start anew, for example only by the user's initiation or request, etc.

According to an embodiment the charger may be kept plugged in to the device 10 when it is not needed, and it does not consume unnecessary energy, for example even when the device 10 is integrated into a wall. The charging operation does not wear down batteries. Furthermore, the charging operation does not cause overheating of both batteries and the chargers themselves, which could increase the risk of fire. Because the device automatically cuts off the electric current after a specified time depending on the charging current curve, there is no more worrying about forgetting to unplug mobile or other battery powered electronic devices or chargers, for example for the night. The electrical device, such as a mobile device or, in a bigger scale, an electric vehicle, does not receive charging, and the device 10 automatically stops drawing power from the outlet.

Any kinds of typical chargers may be connected to the device 10 via the AC output 12. Consequently, the device 10 enables various normal or standard charging devices without requiring specific adaptations into the charging device.

Figure 2:
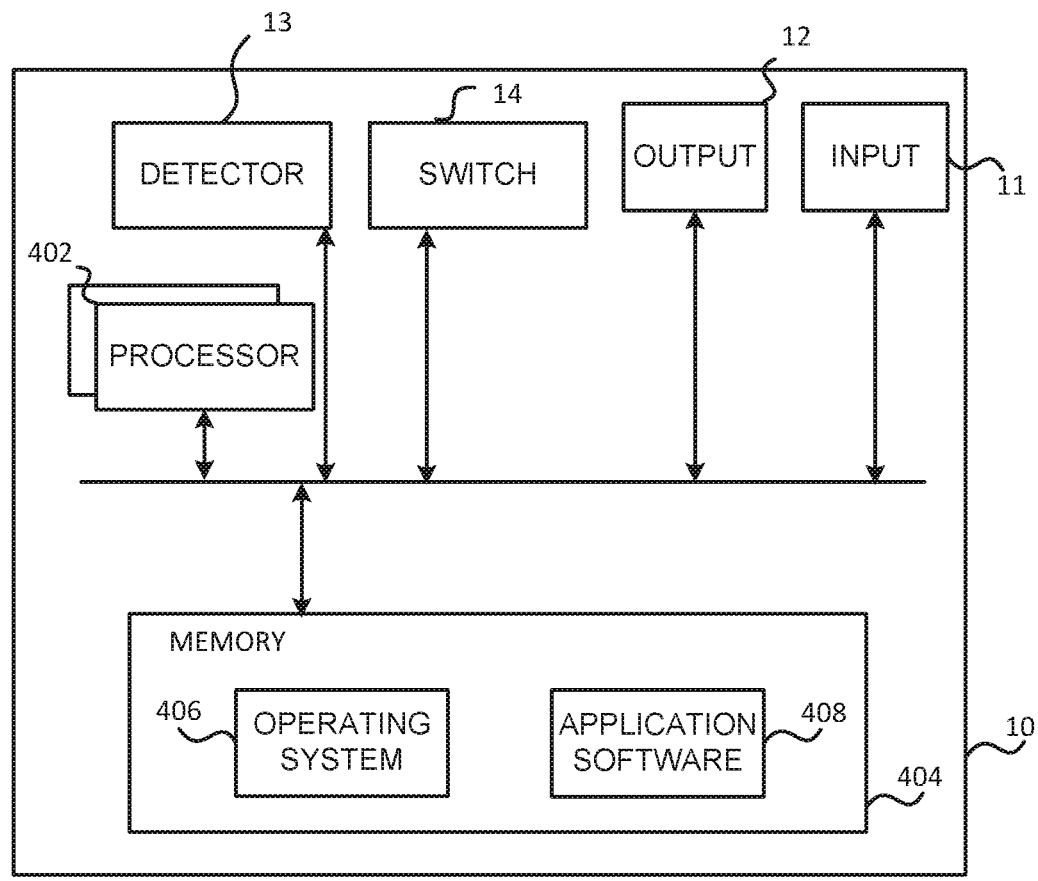
FIG. 2 illustrates a schematic block diagram of a device according to another embodiment.

FIG. 2 illustrates an embodiment of components of a device 10 having a microcontroller 402 operating and configured as the controller, which may be partly implemented in a form of a computing and/or programmable logic for the charging operation. The device 10 is configured to perform the operations and functions of FIGS. 3 to 5 as described below.

The device 10 comprises one or more processors 402 which may be microprocessors, controllers or any other suitable type of processors for processing computer executable instructions to control the operation of the device 10. Platform software comprising an operating system 406 or any other suitable platform software may be provided on the chargers to enable application software 408 to be executed on the device 10.

Computer executable instructions may be provided using any computer-readable media that are accessible by the device 10. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, or program modules. Computer storage media include, but are not limited to, RAM, ROM, EPROM, EEPROM, flash memory or other memory technology, optical storage, magnetic disk storage or other magnetic storage devices, or any other non-transmission medium that can be used to store information for access by a computing device. In contrast, communication media may embody computer readable instructions, data structures, program modules, in a modulated data signal, such as a carrier wave, or other transport mechanism.

The device 10 may comprise an AC input 11 which may be a reception of AC mains. Alternatively, the device 10 may be coupled to an input acting as a reception, which is not a part of the device 10. According to an embodiment, it may be an AC input of 230V. Alternatively, the AC input may be 400V. The reception may be configured to receive an electric current and accordingly electrical power energy from electric mains. The device 10 comprises a detector 13. The detector 13 is configured to detect an AC current in relation to a charger charging the battery. The detector 13 with the processor 402 detects the AC current and determines values for the DC charging such as the DC charging current. The device 10 may comprise an AC output 12 such as a supply. Alternatively, the device 10 may be coupled to an output acting as a supply, which is not a part of the device 10. The supply is configured to supply the AC power to a charger charging a battery.

The device 10 comprises a switch 14. The microcontroller 402 is configured to control the charging operation based on the detected values of the charging. The controller 402 receives an input from the detector 13. The microcontroller 402 outputs signals for switching off the charging for the switch 14 that implements the switching on and off.

According to an embodiment the microprocessor 402 may operate in combination with the switch 14 and detector 13, and the software 408 may be configured for the charging operations and functions as discussed below with respect to the embodiments of FIGS. 3 to 5.

The functionality described herein can be performed, at least in part, by one or more hardware logic components. According to an embodiment, the device 10 is configured by the program code 406, 408, when executed by the processor 402, to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Figure 3:
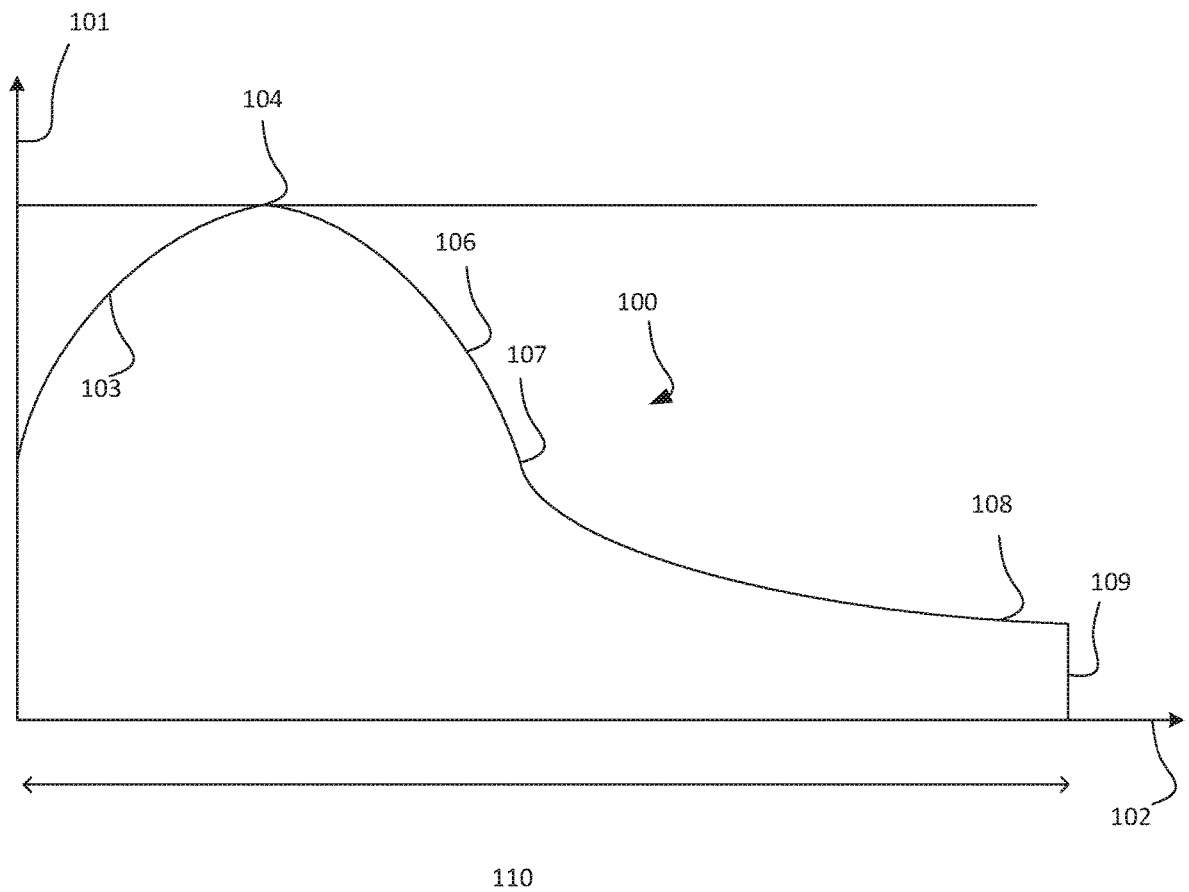
FIG. 3 illustrates a schematic diagram of a DC charging current of a charging operation according to an embodiment.

FIG. 3 illustrates a schematic diagram of a DC charging current 100 of a charging operation according to an embodiment. The charging operation is illustrated in FIG. 3 as having a charging cycle 110. The charging cycle may depend on a battery capacity and/or how much capacity the battery currently has. The charger charges an electrical device according to the charging operation.

The Y axis 101 illustrates a DC charging current 101 and the X axis 102 illustrates time 102. The microprocessor 402 of the device 10 determines the DC charging current 100 of a battery of an electrical device based on detected AC current and AC voltage of the device 10. The detector 402 also determines charging current values in relation to the DC charging current 100.

The microprocessor 402 determines DC charging current values illustrating the charging current 100 in FIG. 3 based on measured AC current and AC voltage in the device 10. The microprocessor 402 may further determine active power based on the measured AC values. The microprocessor 402 may utilize the measurements and the active power information to determine and simulate DC charging current within a certain amount of time, for example one second. The microprocessor 402 stores the charging current values per each second. Furthermore, the microprocessor 402 may average the stored charging current values per one minute. The averaged charging current value may establish the DC charging current value. It should be noted that the numerical values may be altered to be more or less frequent, for example the DC charging current values may be detected hundred times per second, and an average for this may be determined per 10 seconds, etc. Also, the DC current values may be received by different kind of detection. Consequently, the detected actual DC charging current corresponds to the DC charging current value with a reasonable accuracy. There may be some minor exceptions; for example, when the charging current value is zero, the actual charging current may not be exactly zero.

Referring to FIG. 3, when the charging operation has been started, the DC charging current 100 increases at point 103. The microprocessor 402 of the device 10 determines and detects a maximum value 104 of the simulated DC charging current 100. The microprocessor 402 may determine the maximum value 104 so that a new maximum DC current value is saved each time the detected maximum value is higher than the previously stored maximum value. After detecting the maximum value 104, the microprocessor 402 may proceed to the next stage of charging, wherein the DC charging current decreases at point 106. The microprocessor 402 determines and detects a threshold DC current value 107 at this stage of the charging operation. According to an embodiment, the threshold DC current value 107 may be a predetermined percentage value of the maximum value. The percentage value may be for example from 25% to 75% of the maximum value 104, for example 30%-70%, 40%-60%, 45%-66%, etc. According to an embodiment, the threshold DC current value 107 is 49% of the maximum current value 104. The microprocessor 402 may proceed to detecting the threshold DC current value 107 from detecting the maximum value 104 if: an average value of the detected DC charging current 100 within a predetermined time interval is smaller than the maximum value 104, and at least a predetermined time, such as at least one minute, has passed from detecting the latest maximum value 104. According to an embodiment, however, if the controller 402 determines and detects that the maximum value 104 is below a general threshold value, which may depend on the battery capacity and/or the charging state within a period of time, the controller 402 may directly control the switch 14 of the device 10 for disconnecting the charging. This may relate to a situation where the charging has not started for some reason.

After detecting the threshold DC current value 107, the microprocessor 402 may proceed to the next stage of charging, wherein the decrease of the DC charging current 100 becomes gentle. Thus, after detecting the threshold DC current value 107, the microprocessor 402 determines and detects a change of subsequent values of the DC charging current values. Based on the change, the microprocessor 402 determines and detects whether the change falls below a threshold DC change value 108. The microprocessor 402 may detect the change so that at least two subsequent DC charging current values are detected. The microprocessor 402 then compares the two subsequent DC charging current values to each other. The change is below the threshold DC change value 108 if the latest value of the subsequent values is by a certain amount smaller than the previous value of the subsequent values. For example, the latest value may be a few percentages smaller than the previous value, for example 3-7%. Furthermore, generally the microprocessor 402 may check that it has performed this detection for a predetermined time, for example 180 s.

After detecting that the threshold change value 108 has been reached below, the microprocessor 402 controls the switch 14 of the device 10 for disconnecting the charging at point 109. According to an embodiment, the controller 402 controls the switch 14 for disconnecting the charging so that the AC output 12 is switched off from the mains connection to the charger. According to an embodiment, after controlling the switch 14 for disconnecting the charging, the microprocessor 402 may further shut down part of the device 10, for example after a predetermine time, for example 10 s, has lapsed. Consequently, the device 10 may shut down the whole charger or charging apparatus. According to an embodiment, after controlling the switch 14 for disconnecting the charging, the microprocessor 402 may further switch illumination of the device 10 on.

Figure 4:
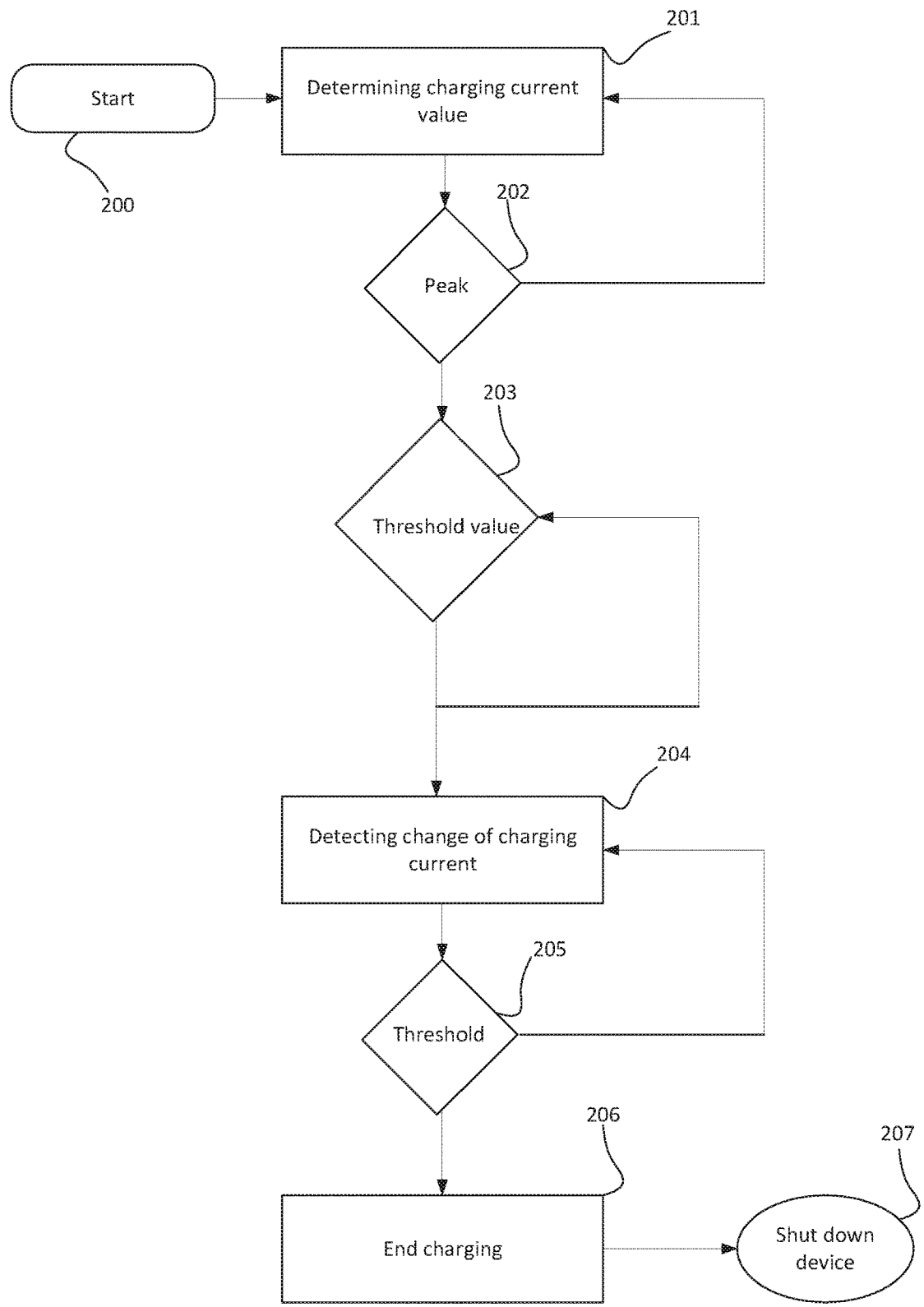
FIG. 4 illustrates a schematic flow chart of a charging operation based on a DC charging current according to an embodiment.

FIG. 4 illustrates a schematic flow chart of the charging operation according to an embodiment. The flow chart is performed in the microcontroller 402 of the device 10 as the charging operation.

In operation 200, the charging operation starts. For example, the user initiates charging by connecting the charger and the device 10, or gives an indication to start charging. This may trigger the start button 15. In operation 201, a DC charging current 100 of a battery of a charger is detected. The DC charging current may be detected based on AC current and AC voltage values measured by the device 10 between an AC input 11 and output 12. Active power may be derived from the AC values. The active power may be further used to estimate the power used on the DC side and further to simulate DC charging current. The DC charging current values are determined in relation to the DC charging current. In operation 202, a maximum value 104 of the DC charging current 100 is determined. In case the maximum value is not determined, the process returns to operation 201. In case the maximum value 104 is detected, the process proceeds to operation 203. In operation 203, the DC charging current is detected and a threshold DC current value of the DC charging current is detected. In case it is not detected, the process remains at operation 203. After detecting the threshold DC current value, the process proceeds to operation 204 for detecting a change of the DC charging current. In operation 205, if the change of the DC charging current falls below a threshold, the process proceeds to operation 206, and if it does not reach the threshold, the process remains at operation 205. After detecting that the DC charging current change falls below the threshold, the process proceeds to operation 206 for disconnecting the charging. The charger may be switched off at operation 207.

Figure 5:
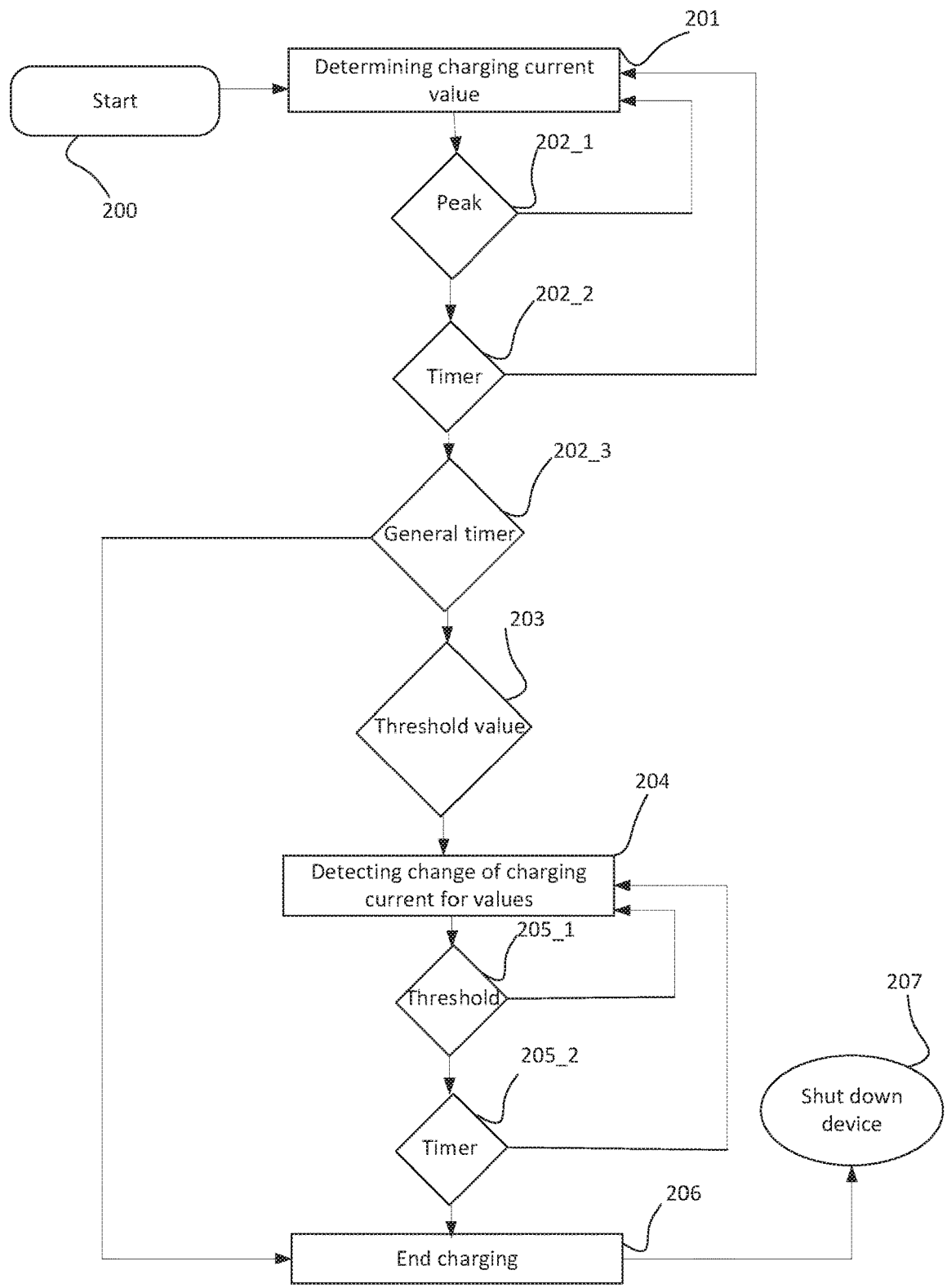
FIG. 5 illustrates a schematic flow chart of a charging operation based on a DC charging current according to another embodiment.

FIG. 5 illustrates a schematic flow chart of the charging operation according to another embodiment. The charging process of FIG. 5 may be similar to the embodiment of FIG. 4 with respect to operations 200, 201, 203, 204, 206 and 207. FIG. 5 illustrates an embodiment for operation 200 of FIG. 4. It should be noted that the numerical values which are described in the embodiments are only illustrative, and there may be other numerical values as well. For example, the numerical values may be in relation to a capacity of the battery to be charged. Consequently, they may vary greatly, depending on the battery capacity and the used charging current. Additionally, the charging determination may be based on different kinds of numerical values, wherein the relation of the used numerical values varies greatly, than in the embodiments described.

In operation 202_1, the maximum value 104 is detected so that a DC current charging current value is compared to the stored maximum value 104. In case the DC current value is smaller than the stored maximum value, the process proceeds to operation 202_2. In operation 202_2, a timer is checked so that a certain time, for example one minute, has lapsed after the detection of the maximum value. In operation 202_3, a general timer is checked so that if the DC charging current value is below a threshold and a certain time has lapsed, the process proceeds directly to operation 206 ending the charging. This may relate to a situation where the charging has not started for some reason. In case both operations 202_1 and 202_2 are fulfilled, the process proceeds to operation 203. In operation 203, a threshold DC current value of the DC charging current is detected. The threshold DC current value is lower than the peak charging current value. The threshold DC current value may be for example a certain percentage of the peak charging current.

In operation 204, two DC charging current values are determined. The values are subsequent and/or consecutive. The two values are compared to determine a change in current between the two subsequent values. In operation 205_1 the change is compared to a predetermined threshold to see if the change is smaller than the threshold. In operation 205_2, it is checked that at least a certain amount of time has been used for determining the two subsequent charging current values. The operation 205_2 may ensure that the detected change in DC current values is sustained. When the detected change is small enough, and continued for a sufficient time, the operation proceeds to operations 206 and 207 as described in connection with FIG. 4. A predetermined threshold value may be used to determine when the change between the two current values is small enough to proceed to the next operation(s).

According to an embodiment, in operation 204, three or more DC charging current values may be determined. They may be subsequent and/or consecutive DC charging current values, which are determined according to the embodied process. However, the second value or the value(s) in the middle, for example values between the first and the last ones of the embodied operation 204, may be omitted. Consequently, the determination of change in DC charging current, may be based on the first and the last ones of these values only.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a detector configured to detect an AC charging current for a charger charging a battery of an electrical device;
a switch configured to connect and disconnect an AC output configured to be connected to the charger;
a controller configured to:
detect an AC voltage;
based on the AC voltage and the AC charging current, determine an active power;
based on the active power, determine a DC charging current of the charger and determine DC charging current values in relation to the DC charging current;
detect a maximum value of the DC charging current values based on a peak value of the active power;
after detecting the maximum current value, detect a threshold DC current value of the DC charging current values in relation to the detected maximum current value;
after detecting the threshold DC current value, detect a change of subsequent values of the DC charging current values, and based on the change, detect whether the change is below the threshold DC current value;
after detecting the change is below the threshold DC current value, control the switch for disconnecting the AC output.

2. The device of claim 1, wherein the controller is further configured to receive characteristics of the charger comprising information of a DC power of the charger and information of a power loss of the charger and determine the DC charging current accordingly.

3. The device of claim 2, wherein the controller is further configured to receive information of a DC voltage of the charger and determine the DC power of the charger, wherein the DC voltage further comprises said characteristics.

4. The device of claim 1, wherein the controller is further configured to determine an angular difference between the AC voltage and the AC current, based on the angular difference determine a power factor, and based on the power factor determine the active power.

5. The device of claim 1, wherein the controller is further configured to switch the device off after detecting the exceeding of the threshold, wherein switching off the device causes the AC output to disconnect.

6. The device of claim 1, wherein after controlling the switch for disconnecting the AC output, the controller is further configured to shut down the device after a predetermined time has lapsed.

7. The device of any preceding claim 1, further including a manual switch configured to switch the device on when the device has been switched off, wherein switching the device on triggers the detector and the controller to start operating.

8. The device of claim 1,
wherein the controller is configured to detect the maximum current value so that a new value is saved each time a maximum current value which is higher than a previous maximum current value is detected; and
the controller is configured to proceed to detecting the threshold DC current value when:
an average value of the detected DC charging current values within a predetermined time interval is smaller than the maximum current value; and
a predetermined time has passed from detecting the latest maximum current value.

9. The device of claim 1, wherein when the controller detects that the maximum current value is below a general current threshold value within a period of time, the controller is configured to directly control the switch for disconnecting the charging.

10. The device of claim 1, wherein the threshold DC current value is a predetermined percentage value of the maximum current value.

11. The device of claim 1, wherein the controller is configured to detect the change so that at least two subsequent DC charging current values are detected, and the two subsequent DC charging current values are compared to each other; and
wherein the change is below the threshold DC change value if the latest value of the subsequent values is certain amount smaller than the previous value of the subsequent values; and the controller has performed detection for a predetermined checking time.

12. The device of claim 1, wherein the controller is configured to detect the change so that three subsequent DC charging current values are detected, the centremost value of the three values is deleted and the outermost values of the three values are compared to each other; and
wherein the change is below the threshold if a difference between the outermost values is smaller than a certain amount; and the controller has performed detection for a predetermined checking time.

13. The device of claim 1, wherein after controlling the switch for disconnecting the AC voltage, the controller is further configured to switch illumination of the device on.

14. A charger, connected to the AC output of the device according to claim 1, and configured to charge the battery of an electrical device.

15. A structure, comprising the device according to claim 1, and configured to be connected to the charger by the AC output.

16. A method, comprising:
detecting an AC charging current for a charger charging a battery of an electrical device;
detecting an AC voltage;
based on the AC voltage and the AC charging current, determining an active power;
based on the active power, determining a DC charging current of the charger and determining DC charging current values in relation to the DC charging current;
detecting a maximum value of the DC charging current values based on a peak value of the active power;
after detecting the maximum value, detecting a threshold DC current value of the DC charging current values in relation to the detected maximum current value;
after detecting the threshold DC current value, detecting a change of subsequent values of the DC charging current values, and based on the change, detecting whether the change below the threshold DC current value;
after detecting the change below of the threshold DC current value, controlling a switch for disconnecting an AC output configured to be connected to the charger.

17. A computer program stored in a non-transitory computer storage media, comprising a program code wherein the program code is configured to perform the steps of the method of claim 16 when executed by a device comprising:
a detector configured to detect an AC charging current for a charger charging a battery of an electrical device;

a switch configured to connect and disconnect an AC output configured to be connected to the charger;

a controller configured to:

detect an AC voltage;

based on the AC voltage and the AC charging current, determine an active power;

based on the active power, determine a DC charging current of the charger and determine DC charging current values in relation to the DC charging current detect a maximum value of the DC charging current values based on a peak value of the active power;

after detecting the maximum current value, detect a threshold DC current value of the DC charging current values in relation to the detected maximum current value;

after detecting the threshold DC current value, detect a change of subsequent values of the DC charging current values, and based on the change, detect whether the change is below the threshold DC current value;

after detecting the change is below the threshold DC current value, control the switch for disconnecting the AC output.

\* \* \* \* \*